US008649136B2

(12) United States Patent
Seth et al.

(10) Patent No.: US 8,649,136 B2
(45) Date of Patent: Feb. 11, 2014

(54) THIN-OXIDE CURRENT CLAMP

(75) Inventors: Sumantra Seth, Karnataka (IN); Jayesh Wadekar, Maharashtra (IN)

(73) Assignee: Texas Instruments Incorporated, Dallas, TX (US)

( * ) Notice: Subject to any disclaimer, the term of this patent is extended or adjusted under 35 U.S.C. 154(b) by 176 days.

(21) Appl. No.: 13/226,498

(22) Filed: Sep. 7, 2011

(65) Prior Publication Data

US 2012/0063041 A1 Mar. 15, 2012

(30) Foreign Application Priority Data

Sep. 9, 2010 (IN) .............................. 2639/CHE/2010

(51) Int. Cl.
*H02H 9/00* (2006.01)
(52) U.S. Cl.
USPC .......................................................... 361/56
(58) Field of Classification Search
None
See application file for complete search history.

(56) References Cited

U.S. PATENT DOCUMENTS

| 7,379,283 | B1 * | 5/2008 | Farrenkopf et al. | 361/91.3 |
|---|---|---|---|---|
| 7,724,486 | B2 * | 5/2010 | Groiss | 361/56 |
| 2010/0328827 | A1 * | 12/2010 | Lai et al. | 361/56 |
| 2011/0007437 | A1 * | 1/2011 | Kataoka | 361/56 |

* cited by examiner

*Primary Examiner* — Jared Fureman
*Assistant Examiner* — Terrence Willoughby
(74) *Attorney, Agent, or Firm* — Lawrence J. Bassuk; Wade J. Brady, III; Frederick J. Telecky, Jr.

(57) ABSTRACT

A thin-oxide current clamp includes a clamp transistor in current-conducting relation between a voltage-sensitive circuit and a common return of a power supply, the clamp transistor responsive to a sense output signal to provide a low-resistance current flow path from the voltage-sensitive circuit to the common return and thereby clamp a voltage in the voltage-sensitive circuit. The thin-oxide current clamp also includes a current source and a reference current mirror, the reference current mirror providing a reference current. Further, the thin-oxide current clamp includes a sense current mirror providing a sense current. Further, the thin-oxide current clamp also includes an output transistor that receives the sense current and provides a current flow to a gate of the clamp transistors if the sense current exceeds the reference current.

19 Claims, 3 Drawing Sheets

THIN-OXIDE CURRENT CLAMP

This application claims priority from Indian Provisional Application Serial No. 2639/CHE/2010 filed on Sep. 9, 2010 entitled "AN OVER VOLTAGE (5V) PROTECTION CIRCUIT IN UDSM TECHNOLOGY WITHOUT ANY 3.3V GATE OXIDE TRANSISTOR FOR USB2.0 APPLICATION", which is hereby incorporated in its entirety.

TECHNICAL FIELD

In general, embodiments of the disclosure relate to current clamps. More particularly, the disclosure relate to over-voltage (5V) protection circuit for USB 2.0 application.

BACKGROUND

Currently in electronics circuit design, there is a trend towards miniaturization, specifically, towards the thinning of the oxide layer that forms the insulator between the gate-electrode and the channel in a MOS transistor. As a result of this thinning, the voltages supportable at the gate-electrode, as well as the gate-to-source voltage and the drain-to-source voltage become smaller. Lower voltage and thinner gate oxide are both concomitant with lower power consumption and higher switching speeds. However, when an inevitable anomalous high voltage spike happens, which can occur due to an impedance mismatch, an inductive coupling with a higher voltage line, or due to the need to support legacy protocols that used thicker gate-oxides and higher voltages, then the thin-oxide gate will breakdown and result in circuit failure. Therefore, there is need for a mechanism to protect a circuit from high-voltage spikes, and for such mechanism to be constructed out of thin-oxide transistors. The thin-oxide refers to gate-oxide tolerable of 1.8V across it and thick oxide is referred as gate-oxide tolerable of 3.3V across it.

Hence, it is desirable to have a thin-oxide current clamp that prevents excessive current draw due to the anomalous high voltage condition.

SUMMARY

An example of a thin-oxide current clamp includes a clamp transistor in communication with a voltage-sensitive circuit and a current mirror in communication with the voltage-sensitive circuit, the current mirror having a sense output connected to a gate of the clamp transistor.

An example of thin-oxide current clamp includes a clamp transistor in current-conducting relation between a voltage-sensitive circuit and a common return of a power supply, the clamp transistor responsive to a sense output signal to provide a low-resistance current flow path from the voltage-sensitive circuit to the common return and thereby clamp a voltage in the voltage-sensitive circuit. The thin-oxide current clamp also includes a current source that provides a controlled current and a reference current mirror having first and second NMOS transistors with sources connected to the common return, the reference current mirror receiving the controlled current and providing a reference current. Further, the thin-oxide current clamp includes a sense current mirror having a first PMOS transistor with a source connected to a positive terminal of the power supply and a drain that receives the reference current, and a second PMOS transistor with a source connected to a resistor and coupled to pad. Drain of this second PMOS provides a sense current based on pad voltage. Further, the thin-oxide current clamp also includes an output transistor that receives the sense current and provides a current flow to a gate of the clamp transistors if the sense current exceeds the reference current.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the disclosure.

DETAILED DESCRIPTION OF THE EMBODIMENTS

It should be observed that system components have been represented by conventional symbols in the figures, showing only specific details that are relevant for an understanding of the present disclosure. Further, details that may be readily apparent to person ordinarily skilled in the art may not have been disclosed. In the present disclosure, relational terms such as first and second, and the like, may be used to distinguish one entity from another entity, without necessarily implying any actual relationship or order between such entities.

Various embodiments discussed in this disclosure pertain to current clamps that prevent excessive current drawn due to the anomalous high voltage condition.

Figure 1:
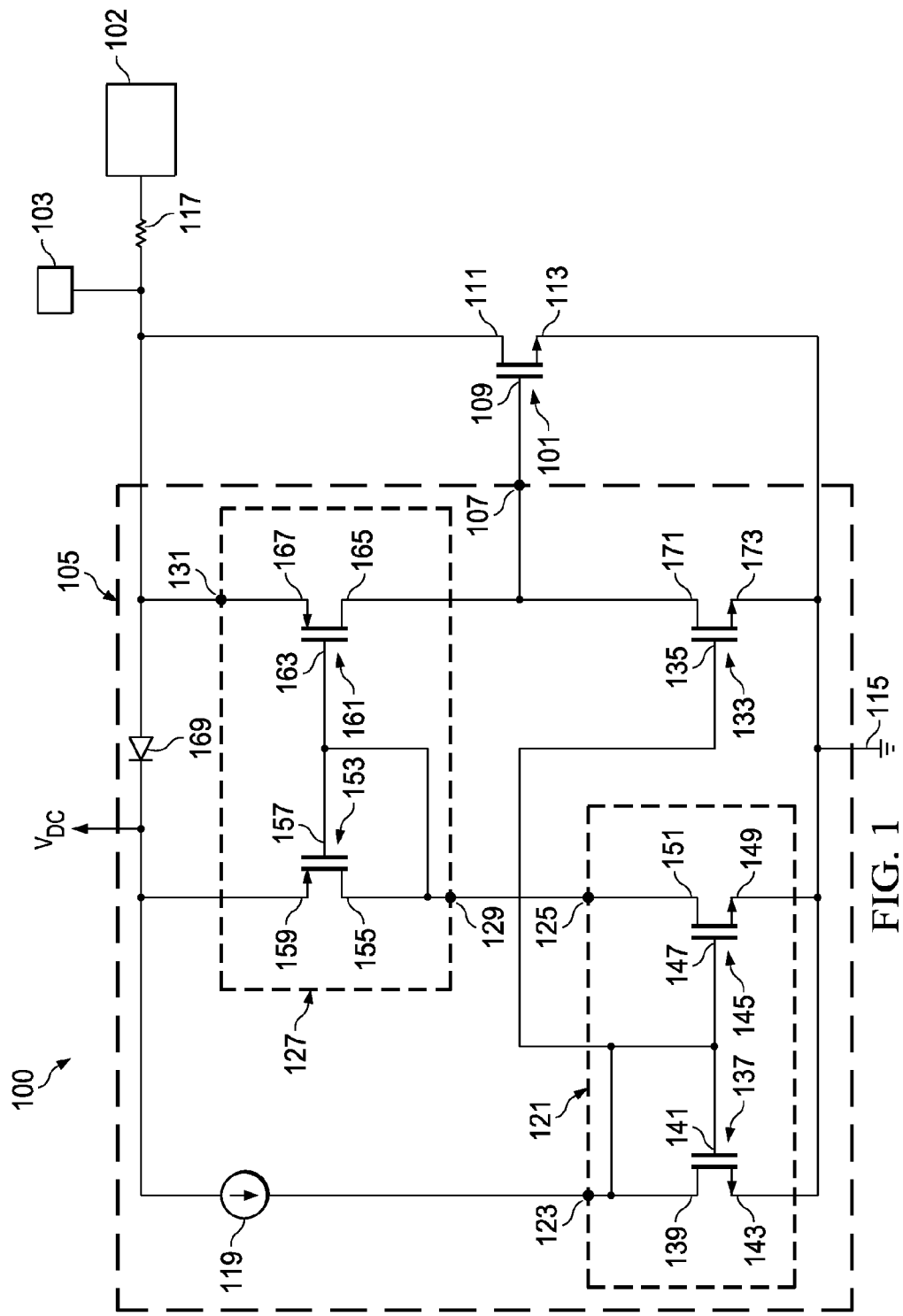
FIG. 1 illustrates a thin-oxide current clamp, in accordance with which various embodiments are implemented.

FIG. 1 is a circuit diagram of a thin-oxide current clamp 100. The thin-oxide current clamp 100 includes a clamp transistor 101 in communication with a voltage-sensitive circuit 103. At the interface between the voltage-sensitive circuit 103 and the current clamp 100 is a pad 102. At the pad 102, the voltage level is nominally between 0 Volts and power supply ($V_{DC}$), for example 3.3 Volts. Occasionally however, the pad 102 may experience a voltage spike that is much higher than the power supply voltage. Such a voltage spike may damage the voltage-sensitive circuit 103; the present disclosure includes techniques by which a voltage spike at pad 102 is prevented from doing damage to the voltage-sensitive circuit 103. A current mirror 105 is also in communication with the voltage-sensitive circuit 103, the current mirror 105 having a sense output 107 connected to a gate 109 of the clamp transistor 101. The clamp transistor 101 is an NMOS transistor having a drain 111 in communication to the voltage-sensitive circuit 103 and a source 113 in communication with a common return 115. A resistor 117 is coupled between the voltage-sensitive circuit 103 and pad 102.

The current mirror 105 includes a reference current source 119. The current mirror 105 also includes a reference current mirror 121 having a reference input 123 in communication with the current source 119 and a reference output 125. Further, the current mirror 105 includes a sense current mirror 127 that provides the sense output 107. The sense current mirror 127 has a sense input 129 in communication with the reference output 125 and a voltage input 131 in communication with the voltage-sensitive circuit 103. Further, the current mirror 105 also includes an output transistor 133 in communication with the sense output 107. The output transistor has a gate 135 in communication with the reference input 123, a drain 171 coupled to the sense output 107 and a source 173 in communication with the common return 115.

The reference current mirror 121 includes a first NMOS transistor 137 with a drain 139 and a gate 141 connected together to define the reference input 123 and a source 143 in communication with the common return 115. The reference current mirror 121 also includes a second NMOS transistor 145 with a gate 147 connected to the reference input 123, a source 149 connected to the common return 115, and a drain 151 that defines the reference output 125. The first NMOS transistor 137 and the second NMOS transistor 145 can be one of ultra-thin-oxide gate transistors or thick-oxide transistors.

The sense current mirror 127 includes a first PMOS transistor 153 with a drain 155 and a gate 157 connected together to define the sense input 129 and a source 159 in communication with a $V_{DC}$. The source 159 of the first PMOS transistor 153 can be in communication with a power supply $V_{DC}$. The sense current mirror 127 also includes a second PMOS transistor 161 with a gate 163 connected to the sense input 129, a drain 165 that defines the sense output 107, and a source 167 that defines the voltage input 131. In some embodiments, the first PMOS transistor 153 and the second PMOS transistor 161 can be one of ultra-thin-oxide gate transistors or thick-oxide transistors.

Further, a diode 169 is connected between the drain 111 of the clamp transistor 101 and supply $V_{DC}$. This diode can be resulted due to parasitic effect of circuits connected between the drain 111 of the clamp transistor 101 and the $V_{DC}$.

The clamp transistor 101 is in current-conducting relation between the voltage-sensitive circuit 105 and the common return 115 of a power supply. The clamp transistor 101 is responsive to a sense output signal to provide a low-resistance current flow path from the voltage-sensitive circuit 103 to the common return 115 and thereby clamp a voltage in the voltage-sensitive circuit 103. The current source 119 provides a controlled current. The reference current mirror 121 having the first and second NMOS transistors (137 and 145) with the sources (143 and 149) connected to the common return 115 receives the controlled current and provides a reference current. The sense current mirror 127 having the first PMOS transistor 153 with the source 159 is connected to a positive terminal of the power supply and the drain 155 that receives the reference current, and the second PMOS transistor 161 with the source 167 is connected to the clamping transistor and the drain 165 provides a sense current. The output transistor 133 receives the sense current and provides a current flow to a gate of the clamp transistor 101 if the sense current exceeds the reference current.

In an embodiment, the pad 102 connected to the voltage-sensitive circuit 103 is nominally between 0 Volts and the power supply ($V_{DC}$), for example 3.3 Volts. Occasionally, a voltage spike occurs at the pad 102 that may potentially damage the voltage-sensitive circuit 103. During quiescent periods, when the voltage at the pad 102 is nominal, the thin-oxide current clamp 100 is inactive. When the voltage spike occurs at pad 102, the gate 109 of the clamp transistor 101 goes high. Subsequently the clamp transistor 101 will turn on, drawing current from the pad 102 and thereby absorbing the voltage spike across the resistor 117. By thus absorbing the voltage spike, the clamp transistor 101 prevents the spike from reaching the voltage-sensitive circuit 103 and thereby protects said voltage-sensitive circuit.

The drain-to-source current of the first NMOS transistor 137 is supplied by the current source 119. When the voltage at the pad 102 equals the power supply voltage $V_{DC}$, then the output transistor 133 also mirrors the current source 119, and the sense output 107 is at the threshold of the clamp transistor 101. If the voltage at the pad 102 exceeds the power supply voltage then the current through the second PMOS transistor 161 will increase. However by current mirror principle, the current through the output transistor 133 will be constrained to equal the current through the current source 119. The excess current through the second PMOS transistor 161 will show up as charge at the gate of the clamp transistor 101 and turn it ON. The clamp transistor 101 will then rapidly absorb current from the voltage-sensitive circuit 105 through the drain 111, and consequently bring down the voltage spike.

Conversely, when the voltage at the pad 102 is below power supply voltage, the current through the second PMOS transistor 161 will be lesser than the current through the output transistor. Subsequently, the gate of the clamp transistor 101 will rapidly be depleted of charge, and the voltage at the sense output 107 will almost become zero volts. The clamp transistor 101 will shut off and no current will be absorbed from the pad 102. The current clamp 100 will then effectively work independently of the voltage-sensitive circuit 103, and will not hinder or interfere with the operation of the voltage-sensitive circuit 103.

Figure 2:
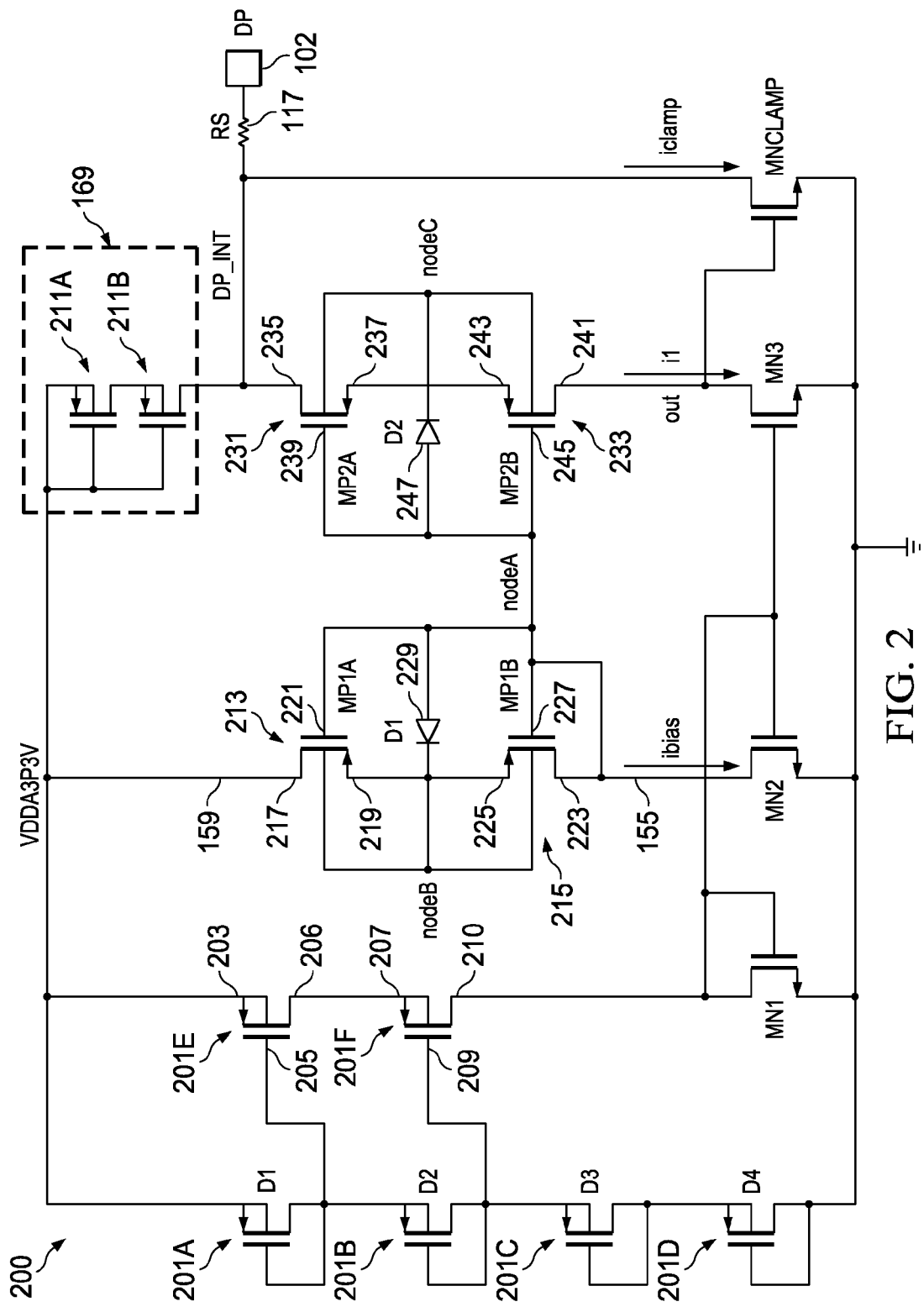
FIG. 2 illustrates a thin-oxide current clamp, in accordance with an embodiment.

In some embodiments, it may be the case that there is no power supply when the voltage spike arrives at the voltage sensitive circuit 103. In such a situation, a thin-oxide clamp that can protect the voltage-sensitive circuit 103 is shown in FIG. 2 as device 200. The thin-oxide clamp 200 is similar to the thin-oxide clamp 100 of FIG. 1, except that the reference current source 119 is specified in 200 as comprising six transistors.

Here, the current source 119 includes a first through fourth PMOS transistors (201a, 201b, 201c and 201d) in a series connection between the power supply and the common return 115. The current source 119 also includes a fifth PMOS transistor 201e having a source 203 connected to the source 159 of the first PMOS transistor 153 and a gate 205 connected to the gate of the first PMOS transistor 201a. Further, the current source 119 includes a sixth PMOS transistor 201f having a source 207 connected to a drain 206 of the fifth PMOS transistor 201e, a gate 209 connected to the gate of the third PMOS transistor 201c, and a drain 210 connected to the reference input 123.

The diode 169 can be a combination of back-to-back PMOS transistors (211a and 211b) as shown in FIG. 2. This diode can be resulted due to parasitic effect of circuit present between the drain 111 of the clamp transistor 101 and the $V_{DC}$.

Further, the first PMOS transistor 153 can be constructed using a pair of source-to-source connected PMOS transistors (213 and 215). The PMOS transistor 213 has a drain 217 corresponding to the source 159 of the first PMOS transistor 153, a source 219 and a gate 221. The PMOS transistor 215 has a drain 223 corresponding to the drain 155 of the first PMOS transistor 153, a source 225 and a gate 227. The gate 227 and the drain 223 are connected together. The first PMOS transistor 153 also includes a diode 229 having a cathode connected to the sources (219 and 225) and an anode connected to gates (221 and 227) of the PMOS transistors (213 and 215). The second PMOS transistor 161 can be constructed using a pair of source-to-source connected PMOS transistors (231 and 233). The PMOS transistor 231 has a drain 235 corresponding to the source 167 of the second PMOS transistor 161, a source 237 and a gate 239. The PMOS transistor 233 has a drain 241 corresponding to the drain 165 of the second PMOS transistor 161, a source 243 and a gate 245. The second PMOS transistor 161 also includes a diode 247 having a cathode connected to the sources (237 and 243)

and an anode connected to gates (239 and 245) of the PMOS transistors (231 and 233). The first PMOS transistor 153 and the second PMOS transistor 161 are defined as composite transistors.

When the power supply is on, the diode 169 is reverse-biased, and the thin-oxide current clamp 200 works identical to the thin-oxide current clamp 100 of FIG. 1.

If the power supply is off, and a voltage spike appears at the voltage sensitive circuit 103, then the diode 169 gets forward-biased and starts charging the power supply. Once the power supply charge reaches a critical value, which is given by the sum of the threshold voltages of the four PMOS transistors comprising the power source, the current source 119 turns on, and the thin-oxide current clamp 200 works identical to the thin-oxide current clamp 100 of FIG. 1. Essentially the voltage spike has served to power the thin-oxide current clamp 200.

The current clamp 100 of FIG. 1 works in any general application that requires over-voltage protection. They are directly applicable to CMOS technologies whose gates are rated for 3.3 Volts.

Figure 3A:
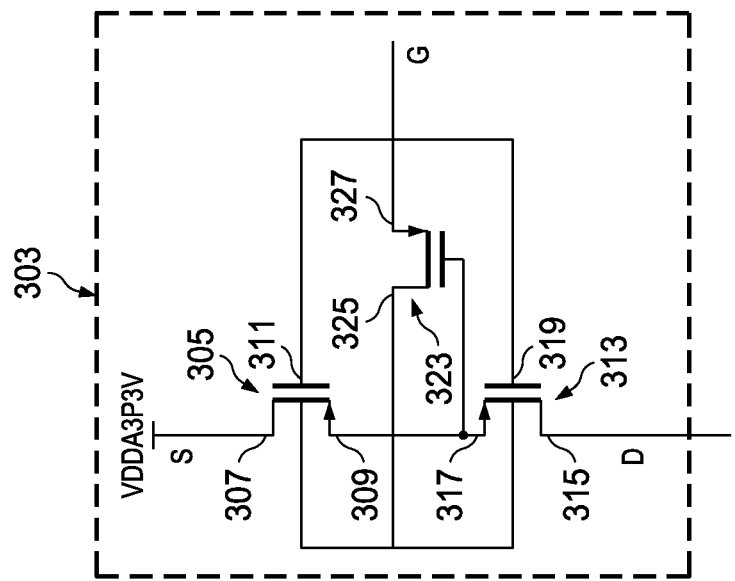
FIG. 3A-3B illustrates composite transistors, in accordance with an embodiment.

For applications for voltage protection implemented using ultra-deep sub-micron (UDSM) technology, the thin-oxide current clamp 200 is applicable. The present disclosure solves the problem of sustaining large drain-to-source voltages using thin-oxide technology known as the "composite transistor," disclosed and described herein. The composite transistor is a three-terminal device that behaves like an ordinary MOS transistor. The composite transistor is itself made of a diode and two thin-oxide transistors but by virtue of the inter-connection of the constituent transistors, the composite transistor is able to withstand high gate-to-drain voltages. It is possible that the diode itself is made of a thin-oxide transistor whose gate and drain have been shorted. Such composite transistors (301 and 303) are shown in FIG. 3A-3B.

The composite transistor 301 includes a first PMOS transistor 305 having a drain 307 defining a source of the composite transistor 301, a source 309 and a gate 311. The composite transistor 301 also includes a second PMOS transistor 313 having a drain 315 defining a drain of the composite transistor 301, a source 317 and a gate 319. The gates (311 and 319) are joined together to define a gate of the composite transistor 301. The composite transistor 301 also includes a diode 321 having a cathode connected to the sources (309 and 317) and an anode connected to the gates (311 and 319) of the first and the second PMOS transistors (305 and 313).

Figure 3B:
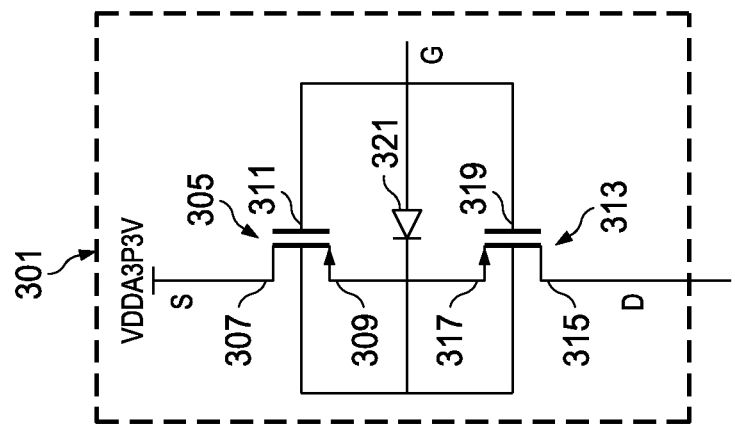

In an embodiment, the diode 321 can be replaced with a PMOS transistor 323 as shown in FIG. 3B. A drain 325 and a gate 327 of the PMOS transistor 323 are shorted and connected to the sources (309 and 317) and a source 329 is connected to the gates (311 and 319) of the first and the second PMOS transistors (305 and 313). An example of the composite transistors in a current clamp is illustrated in FIG. 2.

The composite transistors defined in the present disclosure can be used in any application where a high gate-to-drain voltage rating is needed using a thin-oxide technology. For example, in an application where a thin-oxide switch has to connect or disconnect two terminals that may be separated by 3.3 Volts, a composite transistor may serve as the thin-oxide switch.

The thin-oxide current clamp disclosed in the present disclosure, in the event of a voltage spike acts to absorb any excess current appearing in a circuit. For example, absorbing voltage spikes in a USB driver. In addition, the power consumed by the thin-oxide current clamp is also considerably reduced.

In the foregoing discussion, each of the terms "coupled" and "connected" refers to either a direct electrical connection or mechanical connection between the devices connected or an indirect connection through intermediary devices.

The foregoing description sets forth numerous specific details to convey a thorough understanding of embodiments of the disclosure. However, it will be apparent to one skilled in the art that embodiments of the disclosure may be practiced without these specific details. Some well-known features are not described in detail in order to avoid obscuring the disclosure. Other variations and embodiments are possible in light of above teachings, and it is thus intended that the scope of disclosure not be limited by this Detailed Description, but only by the Claims.

What is claimed is:

1. A thin-oxide current clamp comprising:
   a clamp transistor in communication with a voltage-sensitive circuit through a pad; and
   a current mirror in communication with the voltage-sensitive circuit through the pad, the current mirror having a sense output connected to a gate of the clamp transistor, the current mirror including:
   a current source;
   a reference current mirror having a reference input in communication with the current source, the reference current mirror having a reference output;
   a sense current mirror that provides the sense output, the sense current minor having a sense input in communication with the reference output and a voltage input in communication with the voltage-sensitive circuit; and
   an output transistor in communication with the sense output, the output transistor having a gate in communication with the reference input.

2. The current clamp of claim 1 in which the clamp transistor includes an NMOS transistor having a drain in communication with the voltage-sensitive circuit and a source in communication with a common return.

3. The current clamp of claim 2 including a resistor between the voltage-sensitive circuit and the pad.

4. The current clamp of claim 1 in which the current source includes a current source.

5. The current clamp of claim 4 wherein the current source includes:
   first through fourth PMOS transistors in a series connection between a power supply and the common return;
   a fifth PMOS transistor having a source connected to a source of the first PMOS transistor and a gate connected to a gate of the first PMOS transistor; and
   a sixth PMOS transistor having a source connected to a drain of the fifth PMOS transistor, a gate connected to a gate of the second PMOS transistor, and a drain connected to the reference input.

6. The current clamp of claim 1 in which the reference current mirror includes:
   a first NMOS transistor with a drain and a gate connected together to define the reference input and a source in communication with a common return; and
   a second NMOS transistor with a gate connected to the reference input, a source connected to the common return, and a drain that defines the reference output.

7. The current clamp of claim 6 in which the NMOS transistors includes one of an ultra-thin-oxide gate transistor and the thick-oxide transistors.

8. The current clamp of claim 1 in which the sense current mirror includes:

a first PMOS transistor with a drain and a gate connected together to define the sense input and a source in communication with a power supply; and a second PMOS transistor with a gate connected to the sense input, a drain that defines the sense output, and a source that defines the voltage input.

9. The current clamp of claim 8 wherein the source of the first PMOS transistor is in communication with the power supply.

10. The current clamp of claim 8 including a diode connected between the source of the first PMOS transistor and the source of the second PMOS transistor.

11. The current clamp of claim 10 wherein the diode includes two PMOS transistors in series, a first one of the transistors having a source and a gate connected together to define an anode of the diode, and a second one of the transistors having a source connected to a drain of the first one of the transistors, a gate connected to the gate of the first one of the transistors, and a drain that defines a cathode of the diode.

12. The current clamp of claim 8 in which the first PMOS transistor includes a composite transistor.

13. The current clamp of claim 12 in which the composite transistor includes:

a pair of source-to-source connected PMOS transistors, a drain of one of the pair defining a source of the composite transistor, a drain of the other of the pair defining a drain of the composite transistor; and a diode having a cathode connected to the sources of the pair and an anode connected to gates of both of the pair and defining therewith a gate of the composite transistor.

14. The current clamp of claim 13 in which the PMOS transistor pair includes a pair of thin-oxide gate PMOS transistors.

15. The current clamp of claim 8 in which the PMOS transistors includes one of an ultra-thin-oxide gate transistor and the thick-oxide transistors.

16. The current clamp of claim 1 in which the output transistor comprises an NMOS transistor with a drain connected to the sense output and a source in communication with a common return.

17. A thin-oxide current clamp comprising:

a clamp transistor in current-conducting relation between a voltage-sensitive circuit and a common return of a power supply, the clamp transistor responsive to a sense output signal to provide a low-resistance current flow path from the voltage-sensitive circuit to the common return and thereby clamp a voltage in the voltage-sensitive circuit;

a current source that provides a controlled current;

a reference current mirror having first and second NMOS transistors with sources connected to the common return, the reference current mirror receiving the controlled current and providing a reference current;

a sense current mirror having a first PMOS transistor with a source connected to a positive terminal of the power supply and a drain that receives the reference current, and a second PMOS transistor with a source connected to the clamping transistor and a drain that provides a sense current; and an output transistor that receives the sense current and provides a current flow to a gate of the clamp transistors if the sense current exceeds the reference current.

18. A thin-oxide current clamp as in claim 17 wherein at least one of the first and second NMOS transistors and the first and second PMOS transistors includes a thin-oxide gate transistor.

19. A thin-oxide current clamp as in claim 17 wherein at least one of the first and second PMOS transistors includes a composite transistor, the composite transistor having:

a pair of source-to-source connected PMOS transistors, a drain of one of the pair defining a source of the composite transistor, a drain of the other of the pair defining a drain of the composite transistor; and a diode having a cathode connected to the sources of the pair and an anode connected to gates of both of the pair and defining therewith a gate of the composite transistor.

* * * * *